(12) United States Patent
Kosugi et al.

(10) Patent No.: US 8,678,125 B2
(45) Date of Patent: *Mar. 25, 2014

(54) SPEED CHANGE CONTROLLER FOR SADDLE-RIDE TYPE VEHICLES

(71) Applicant: Yamaha Hatsudoki Kabushiki Kaisha, Iwata (JP)

(72) Inventors: Makoto Kosugi, Shizuoka (JP); Michiya Hayashi, Shizuoka (JP); Toshimasa Nakagawa, Shizuoka (JP); Masaichi Yamada, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,674

(22) Filed: Feb. 22, 2013

(65) Prior Publication Data

US 2013/0160590 A1 Jun. 27, 2013

Related U.S. Application Data

(63) Continuation of application No. 10/591,560, filed as application No. PCT/JP2005/013562 on Jul. 25, 2005, now Pat. No. 8,403,093.

(30) Foreign Application Priority Data

Jul. 26, 2004 (JP) ................................ 2004-216937

(51) Int. Cl.
*B62D 61/02* (2006.01)

(52) U.S. Cl.
USPC ......................................................... 180/230

(58) Field of Classification Search
USPC ........................................ 180/230, 344, 337
See application file for complete search history.

(56) References Cited

U.S. PATENT DOCUMENTS

| | | | | |
|---|---|---|---|---|
| 5,024,113 | A | * | 6/1991 | Ito et al. ............................... 74/6 |
| 5,208,520 | A | * | 5/1993 | Sawato et al. ................. 318/551 |
| 2009/0038425 | A1 | * | 2/2009 | Takeuchi ......................... 74/337 |
| 2009/0222182 | A1 | * | 9/2009 | Tomoda et al. ................. 701/67 |
| 2010/0185371 | A1 | * | 7/2010 | Tomoda ........................... 701/67 |

OTHER PUBLICATIONS

Kosugi et al.; "Speed Change Controller for Saddle-Ride Type Vehicles"; U.S. Appl. No. 10/591,560; filed Jun. 28, 2007.

* cited by examiner

*Primary Examiner* — Tashiana Adams
(74) *Attorney, Agent, or Firm* — Keating & Bennett, LLP

(57) ABSTRACT

A speed change controller is provided on a saddle-ride type vehicle and is suited to manipulation by a foot. The speed change controller for saddle-ride type vehicles comprises a detection mechanism that detects operation by a driver for speed change, and a speed change mechanism that performs speed change on the basis of speed change operation detected by the detection mechanism. The detection mechanism provided by the invention comprises an operation part manipulated by a foot for speed change and including a moving part, which moves relative to the vehicle on the basis of manipulation by a foot, and a detection unit that detects that the moving part moves a predetermined amount or more.

16 Claims, 13 Drawing Sheets

SPEED CHANGE CONTROLLER FOR SADDLE-RIDE TYPE VEHICLES

CROSS REFERENCE TO RELATED APPLICATIONS

This application is a National Phase application of International Application No. PCT/JP2005/013562, filed Jul. 25, 2005, which claimed priority to Japanese Application No. 2004-216937, filed Jul. 26, 2004, each of which is hereby incorporated by reference herein in its entirety.

BACKGROUND OF THE INVENTION

1. Field of the Invention

The present invention relates to saddle type vehicles and, more particularly, to a speed change controller for saddle-type vehicle.

2. Description of the Related Art

Conventionally, it is usual in vehicles that a driver's speed change device is mechanically and directly transmitted to a transmission by the use of a link, a rod, or wire to perform speed change operation. In recent years, however, there is proposed to adopt a shift actuator making use of an electric motor or the like to perform speed change operation for the purpose of making speed change operation by a driver easier. For example, JP-A-2001-050389 is as an example of such a shift actuator.

However, the above-referenced publication includes only a description to the effect that instructions of speed change for electrically-driven speed change control may be input into a control unit by a foot-moving type speed change pedal, and does not describe any concrete means for execution of such instructions of speed change. Accordingly, there remains a need for a speed change controller suited to manipulation by a foot.

SUMMARY OF THE INVENTION

An object of the present invention is to provide a speed change controller for a saddle-type vehicle that is configured to be convenient an able to perform speed change operation preferably through manipulation by a foot of a driver.

Accordingly, one aspect of the present invention comprises a speed change controller provided for a saddle-ride type vehicle. The controller comprises a detection mechanism configured to detect an operation by a driver for speed change. The controller also includes a speed change mechanism that performs speed change on the basis of speed change operation detected by the detection mechanism.

In one of the configurations disclosed herein, the detection mechanism comprises an operation part that includes a moving part, which moves relative to the vehicle on the basis of manipulation by a foot, and a detection unit that detects that the moving part moves a predetermined amount or more.

In another configuration disclosed herein, the detection mechanism comprises an operation part comprising a moving part that moves relative to the vehicle through manipulation by a foot, a shift pedal directly manipulated by a foot, and a link member that connects between the pedal and the moving part. Further, the detection mechanism comprises a detection unit that detects that the moving part moves a predetermined amount or more.

In one configuration, one end of the link member is constructed to be connectable to the moving part and attachable to an arm member provided on a shift shaft of the speed change mechanism.

In a further configuration, the moving part comprises a lever member provided to be able to turn, and one end of the link member is constructed to be connectable to the lever member and attachable to an arm member provided on a shift shaft of the speed change mechanism.

In another configuration disclosed herein, the moving part is supported to swing in two different vertical directions, and the detection unit detects a direction, in which the moving part swings, and discriminates between shift-up and shift-down by the direction.

In one preferred arrangement, the detection unit comprises a rotation sensor that detects that the moving part moves a predetermined angle about a predetermined rotating shaft.

In another preferred arrangement, the detection unit comprises at least one sensor to respective different directions, the sensors detecting that the moving part swings a predetermined amount or more in the two different directions from a predetermined reference position.

In another arrangement of the speed change controller disclosed herein, the detection mechanism comprises a base that supports at least the moving part and the detection unit, and the base is provided detachably on the vehicle.

Also, in yet another arrangement of a speed change controller disclosed herein, the moving part is constructed to be movable by manipulation by a foot in two different directions with a predetermined neutral position therebetween. The operation part comprises a return mechanism that automatically returns the moving part, which moves in either of the directions by manipulation by a foot, to the neutral position.

In one preferred arrangement, the detection mechanism comprises a base that supports at least the moving part, the detection unit, and the return mechanism, and the base is provided detachably on the vehicle.

In another of one speed change controller disclosed herein, the moving part is configured to be movable by manipulation by a foot in two different directions with a predetermined neutral position therebetween, and the operation part comprises a stopper that restricts a moving range of the moving part, which moves in either of the directions by manipulation by a foot.

In one preferred arrangement, the detection mechanism comprises a base that supports at least the moving part, the detection unit, and the stopper, and the base is provided detachably on the vehicle.

In one arrangement of a speed change controller disclosed herein, the detection mechanism comprises an operating force changing mechanism that changes torque required for operative movement of the moving part, and the operating force changing mechanism changes torque required for movement of the moving part when or after the detection unit detects that the moving part moves a predetermined amount or more.

In a preferred arrangement, the detection mechanism comprises an operating force changing mechanism that changes torque required for operative movement of the moving part, the operating force changing mechanism being provided on the base, and the operating force changing mechanism changes torque required for movement of the moving part when or after the detection unit detects that the moving part moves a predetermined amount or more.

Also, in a preferred arrangement, the operating force changing mechanism comprises a resistance portion, at least a part of which is deformable by elasticity, and an abutment formed in a position, in which it can contact with the resistance portion through at least manipulation by a foot immediately before the moving part can be detected by the detection unit, and when the moving part moves through manipulation by a foot immediately before it can be detected by the detection unit, at least a part of the resistance portion is pushed by the abutment whereby an increase in the torque is realized, and the abutment is formed so that push against the resistance portion by the abutment is released or the push force is decreased when the moving part moves a predetermined amount, which can be detected by the detection unit.

Also, in another preferred arrangement, the resistance portion comprises a surface portion in contact with the abutment and a spring portion connected to the surface portion, and the abutment comprises a convex portion that pushes the surface portion when the moving part moves through manipulation by a foot immediately before it can be detected by the detection unit.

Further, in a another arrangement, either of the resistance portion and the abutment is attached to the moving part, and the resistance portion or the abutment moves together with the moving part.

In another aspect of a speed change controller disclosed herein, the detection mechanism comprises an operation part including a loaded part, on which a load is applied by manipulation by a foot, and a detection unit that detects the load applied on the operation part.

In one arrangement, the detection mechanism comprises a base that supports the loaded part and the detection unit, and the base is provided detachably on the vehicle.

Also, in another arrangement of a speed change controller disclosed herein, the detection mechanism is supported on a vehicle body frame, which constitutes the saddle-ride type vehicle.

In another aspect of a speed change controller disclosed herein, the operation part comprises a variable mechanism that can change that portion, which is directly manipulated by a foot, in a position relative to the vehicle.

In one preferred arrangement, provided on the variable mechanism are a plurality of screw mount holes or screw mount slots to enable making that portion (for example, a shift pedal), which is directly manipulated by a foot, different in a position, in which it is mounted to the vehicle or the operation part.

Certain aspects and features of the arrangements described above can be provided on a saddle-type vehicle. In one arrangement, the saddle-type vehicle is a motorcycle.

On aspect of the present invention is a speed change controller for saddle-type vehicles that comprises an operation part including the moving part and a detection unit that detects that the moving part moves a predetermined amount or more, or comprises an operation part including the loaded part and a detection unit provided on the loaded part to be able to detect movement of a predetermined amount or more. In this arrangement it is possible to exactly detect a driver's intention for speed change although operation is performed by a foot, which is dull as compared with a hand and difficult to perform a delicate operation, and to surely perform speed change operation on the basis of results of the detection.

Another aspect of the present invention comprises a speed change controller for saddle-ride type vehicles that comprises a base to enable making the detection mechanism a unit. Also, it is possible to make assembling of the detection mechanism to a vehicle. Also, the provision of the base makes it possible to heighten the stiffness of a portion manipulated by a foot.

In one arrangement, the detection mechanism is constructed to be supported on a vehicle body frame whereby it is possible to improve the mechanism in rigidity.

In another arrangement, the speed change controller for saddle-ride type vehicles disclosed herein comprises the operating force changing mechanism whereby it is possible to improve feeling of manipulation by a driver's foot. Also, the return mechanism and/or the stopper is provided whereby manipulation by a driver's foot can be made easy.

DETAILED DESCRIPTION OF THE PREFERRED EMBODIMENTS

"Motorcycle" referred to in the specification of the present application means a motorcycle, includes a bicycle with a motor (motorbike), scooter, and specifically means a vehicle capable of turning with a vehicle body inclined. Accordingly, "motorcycle" includes three-wheeler, four-wheeler (or more), in which at least one of a front wheel and a rear wheel comprises two or more wheels and which is three and four in number of tires. Also, "motorcycle" is not limited to motorcycles but applicable to other vehicles, which can make use of the effect of the invention. "Motorcycle" is applicable to, for example, a so-called saddle-ride type vehicle including four-wheel buggy (ATV (all-terrain vehicle)) and snowmobile.

"Saddle-type vehicle" widely includes vehicles assuming the same ride configuration as or similar to that of a motorcycle.

Also, "operation part" of a saddle-type vehicle disclosed herein can include a part (for example, a shift pedal in a motorcycle) directly manipulated by a foot, and a part (that is, a part indirectly manipulated on the basis of manipulation of a foot) linking with the former part to operate interlocking with the motion of the former part. Accordingly, the part directly manipulated by a foot included in the operation part and the part indirectly manipulated on the basis of manipulation of a foot, both the parts being included in the manipulating part, can be arranged in different regions of a vehicle while interlocking mutually by a link member.

While preferred embodiments of a speed change controller (typically, a device being electrically driven to exercise speed change control) for saddle-type vehicles will be described below with reference to the drawings, it is not intended that the invention is limited to such illustrated examples.

Figure 1:
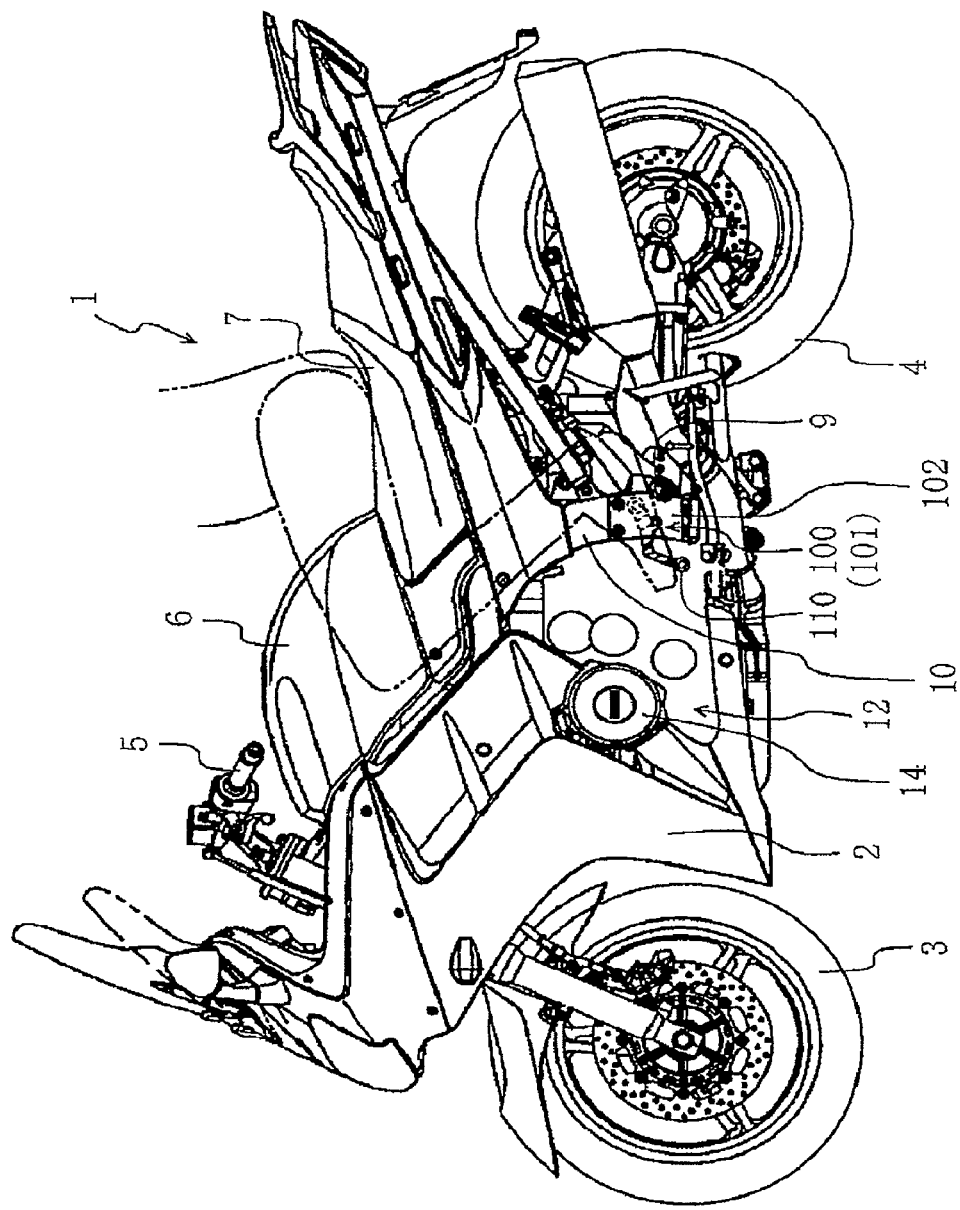
FIG. 1 is a side view showing a motorcycle according to a first embodiment.
Figure 2:
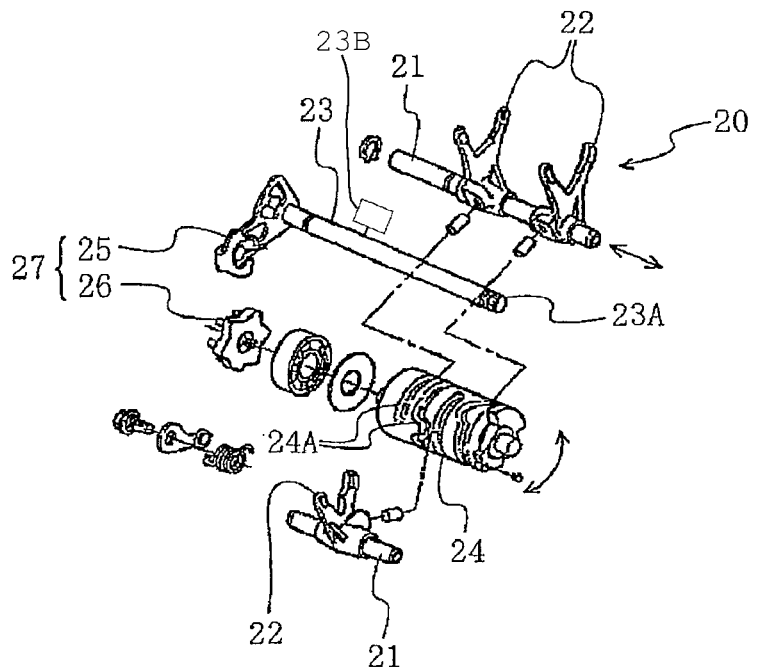
FIG. 2 is an exploded, perspective view showing a speed change mechanism according to the first embodiment.

First, a first embodiment of a speed change controller disclosed herein will be described with reference to FIGS. 1 to 5. FIG. 1 is a side view showing an outward appearance of a motorcycle 1 being a typical example of a saddle-ride type vehicle.

As shown in FIG. 1, the motorcycle 1 according to the embodiment is a sport type motorcycle 1 provided with a large-sized cowling 2, and generally comprises a front wheel 3, a rear wheel 4, a handle 5, a fuel tank 6, and a seat 7. An engine 12 can be supported by a vehicle body frame 10 and can be arranged below the fuel tank 6 and the seat 7. In the illustrated embodiment, a unit 100 (referred below to as "operation unit 100"), which comprises a detection mechanism of a speed change controller according to the illustrated embodiment, is arranged in a state of being supported on the vehicle body frame on a left side (specifically, a neighborhood of a left foot, which performs speed change operation) as viewed from a driver (referred below to as "rider") in a riding state. Details of the operation unit 100 will be described below.

A general transmission (not shown) can be arranged in an engine casing 14 of the engine 12. The transmission can be a general, so-called dog clutch type transmission and can have, for example, four to six number of speeds. Motive power from a crankshaft of the engine 12 can be transmitted to a main axle and then transmitted to drive axles via gears and dogs of the respective number of speeds.

Speed change of the transmission can be performed by a speed change mechanism 20 of the speed change controller according to the illustrated embodiment. That is, as shown in the illustrated embodiment of FIG. 2, the speed change mechanism 20 comprises a shift fork 22 provided slidably on a slide rod 21 to regularly move slide gears of the transmission. Also, a shift cam 24 cant be provided rotatably to slide the shift fork 22.

Figure 3:
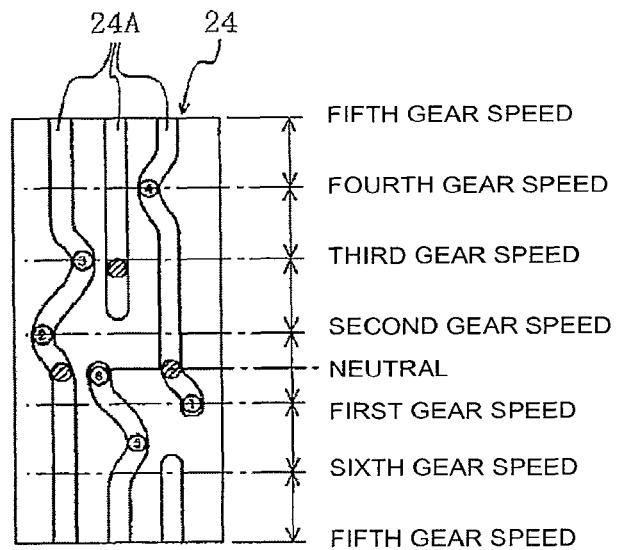
FIG. 3 is a view showing a developed shape of a shift cam groove according to the first embodiment.

A cam groove 24A can be formed on a periphery of the shift cam 24. The cam groove 24A can be formed to be shaped as shown in FIG. 3 and the shift fork 22 slides along the cam groove 24A.

Also, the shift cam 24 can be rotated via a ratchet mechanism 27 upon rotation of a shift shaft 23. The ratchet mechanism 27 can rotate the shift fork 22 by a uniform interval (angle) to regularly move the shift fork 22 and can have a ratchet function in both forward and backward directions to effect speed change one stage by one stage. A shift arm 25 of the ratchet mechanism 27 transmits rotation of the shift shaft 23 to the shift cam 24 and simultaneously restricts a stroke of the shift shaft 23 to prevent overrun of the shift cam 24. Also, a stopper plate 26 of the ratchet mechanism 27 can serve to fix the shift cam 24 to a predetermined position.

The shift shaft 23 can be turned in a predetermined direction by a driving force of a shift actuator 23B, a signal from the operation unit (detection mechanism) 100 described later can be inputted into an engine control unit (ECU) (depiction of which is omitted), and a signal from the engine control unit can drivingly control the shift actuator 23B. In addition, a detailed construction of the speed change mechanism may be the same as that of a conventional motorcycle.

Subsequently, the operation unit (detection mechanism) 100 according to the illustrated embodiment will be described in detail with reference to FIGS. 4 and 5.

In the illustrated embodiment, the operation unit 100 comprises a base plate 102 corresponding to "base" detachably mounted to the vehicle body frame 10 (or the engine casing 14 in another embodiment). The base plate 102 can be a substantially rectangular-shaped plate and can be mounted through mount holes 105A to 105D in four locations in total by screws (not shown) as shown in FIG. 4. The mount holes 66a can be a little larger in diameter than the thread diameter. Thereby, positional adjustment relative to an engine casing 14 is made possible.

Mounted to the base plate 102 can be an operation part 101, which can be operated by a foot for speed change. Also, formed on the base plate 102 can be a foot rest mount 103, to which a foot rest 9 affording placing a rider's left foot thereon is pivotally mounted.

The operation part 101 can comprise a shift pedal 110 corresponding to a moving part in the embodiment. The shift pedal 110 can comprise an arm portion 112, of which one end 112A can be mounted pivotally to an inner surface side (e.g., a side facing a vehicle body). The same can be applied in the base plate 102 and a pedal portion 114 being that portion, which is mounted to the other end 112B of the arm portion 112 can bee manipulated directly by a foot (a tip toe). Specifically, as shown in the illustrated embodiment of FIGS. 4 and 5, the end 112A of the arm portion 112 of the shift pedal 110 is mounted to a boss 104 of the base plate 102 in the vicinity of the foot rest 9 (that is, the foot rest mount 103) by a screw member 108 to freely turn (e.g., being able to swing in two vertical directions) about the screw member 108. Also, a pedal portion (pushed portion) 114 applied by a load from a foot can be provided substantially horizontally on the tip end 112B of the shift pedal 110 (the arm portion 112).

A detection unit 120 according to the illustrated embodiment can be provided on an outer surface side of the base plate 102. That is, the base plate 102 can comprise a sensor, for example, a potentiometer (e.g., a rotation sensor or an angle sensor, which is composed of a potentiometer having a variable resistance element) 122, which comprises a detection unit that detects that the shift pedal (moving part) 110 is moved a predetermined amount or more by manipulation of a foot. A sensor body 123 of the sensor 122 is fixed to the base plate 102. A turning plate 124 can be mounted to the sensor body 123 and can be configured to turn. The turning plate 124 can be turned whereby movement (turning) of the moving part in a predetermined direction can be detected. A detection signal can be transmitted to the engine control unit (ECU).

Figure 4:
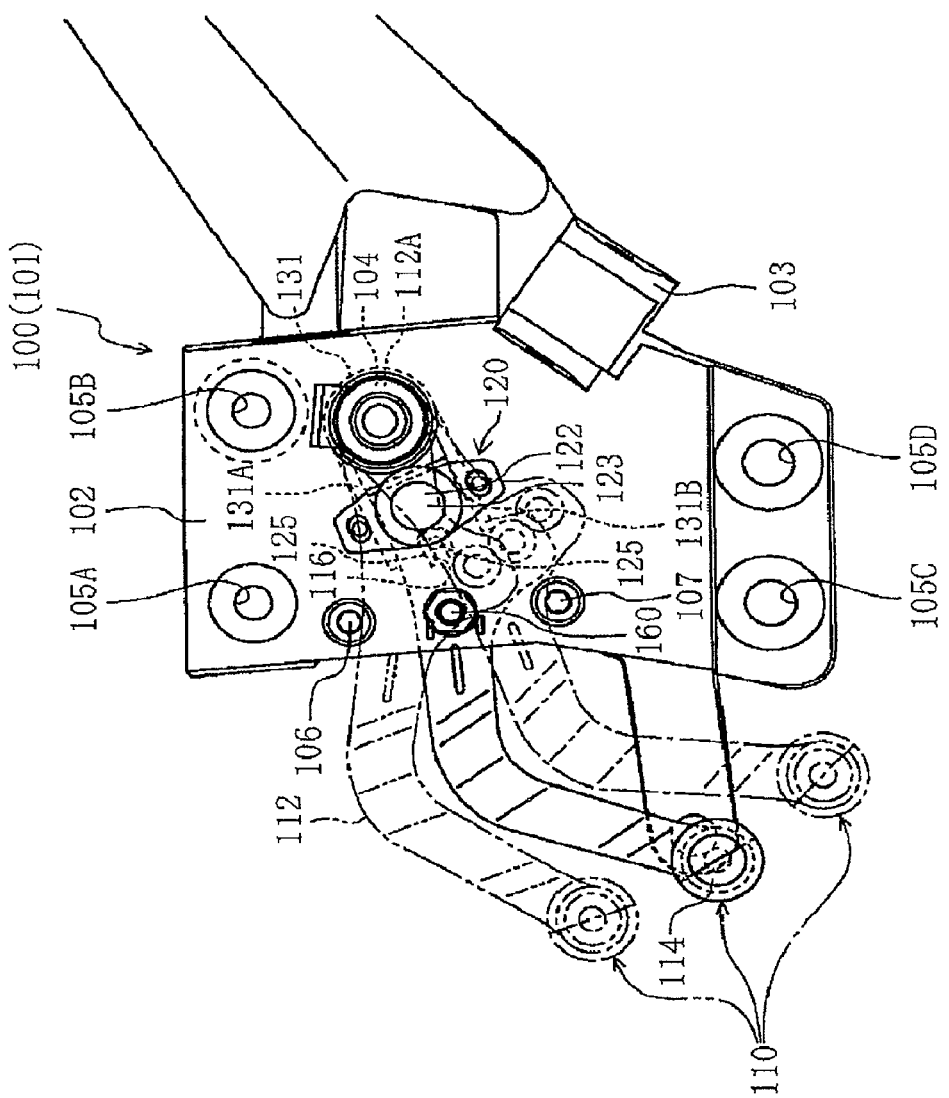
FIG. 4 is a side view showing a state, in which a shift pedal or the like according to the first embodiment is arranged.
Figure 5:
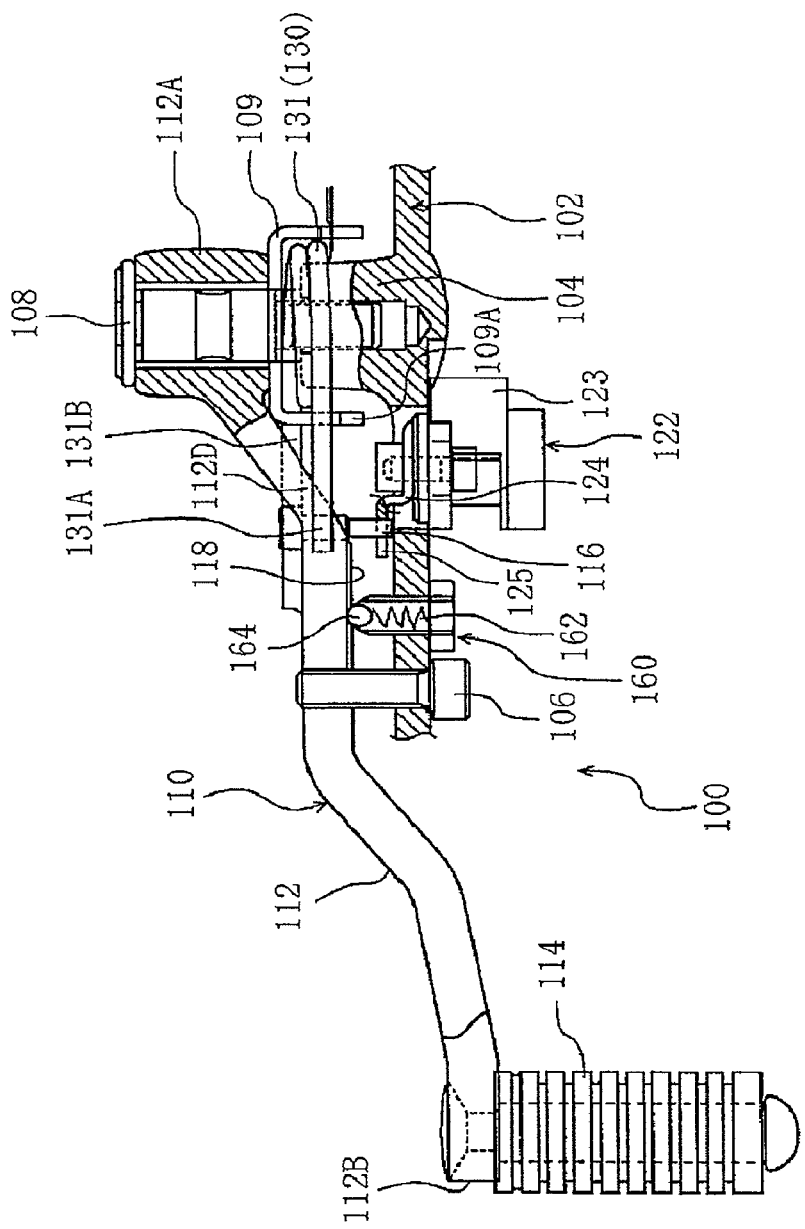
FIG. 5 is a cross sectional view extending substantially in a horizontal direction and showing a state, in which a shift pedal or the like according to the first embodiment is arranged.

The turning plate 124 can be formed with a latch notch 125 as shown in FIGS. 4 and 5. Inserted into the latch notch 125 can be a latch pin 116, which can be protrusively provided on the shift pedal 110. With such construction, when the shift pedal 110 is turned, the turning plate 124 can be turned via the latch pin 116.

Also, in the illustrated embodiment, on an inner surface side of the base plate 102 can be provided spring, which can be in the form of a pine-needle shaped spring (e.g., as shown in the figure, a spring made of a metallic rod, of which a central portion is wound several turns and an angle between both straight ends of which is an acute angle) 131, which acts as "return mechanism" to return the shift pedal 110 to a predetermined neutral position.

The pine-needle shaped spring 131 can comprise a pair of rods (straight ends) 131A, 131B to generate spring elasticity. Interposed between the pair of rods 131A, 131B can be a part (referred below to as "push portion 112D") of the arm portion 112 of the shift pedal 110 and a latch piece 109A of a retainer 109. As shown in FIG. 5, the retainer 109 can be fixed to the boss 104 of the base plate 102.

In addition, the push portion 112D can be formed on a bent part of the arm portion 112 of the shift pedal to be the same in width as other portions as shown in FIG. 5.

As described above, according to the illustrated embodiment, the moving part (shift pedal), the detection unit, and the return mechanism of the operation part are mounted to the base plate 102 to form an integral or single operation unit, so that the operation unit can be mounted integrally or as a group and detachably to the vehicle body frame 10 (or the engine casing 14). Therefore, the operation unit can contribute to an improvement in productivity of motorcycles.

Also, in the illustrated embodiment, two stopper pins 106, 107 can be mounted to the base plate 102. More specifically, as shown in FIGS. 4 and 5, the ascent stopper pin 106 can be mounted in a position, in which it abuts against an upper edge of the shift pedal 110 to be able to stop turning thereof when the shift pedal 110 is moved (turned) a predetermined amount upward as indicated by a two-dot chain line in FIG. 4. On the other hand, as shown in FIG. 4, the descent stopper pin 107 can be mounted in a position, in which it abuts against a lower edge of the shift pedal 110 to be able to stop turning thereof when the shift pedal 110 is moved (turned) a predetermined amount downward as indicated by a dashed line in FIG. 4.

In the illustrated embodiment, also provided on the base plate 102 can be a plunger 160 that comprises an operating force changing mechanism. As shown in FIG. 5, a coil spring 162 can be inserted into a cylindrical-shaped body of the plunger 160. Mounted at a tip end of the plunger 160 is a moving ball 164 connected to the spring 162. The moving ball 164 can be supported by the spring 162 such that when the moving ball 164 is pushed axially of the cylindrical-shaped body with a predetermined force or more, the spring 162 yields to the push force to contract with the result that the moving ball 164 retreats into the cylindrical-shaped body. On the other hand, when such push disappears, the spring 162 is elongated by elasticity and the moving ball 164 returns to an original position (see FIG. 5) at the tip end of the plunger 160.

On the other hand, insertion grooves 118 can be formed in two locations on the shift pedal 110 to correspond to the plunger 160 and to comprise the operating force changing mechanism. Specifically, the insertion grooves 118 can be formed in those positions to realize insertion of the moving ball 164 at the tip end of the plunger 160 into the insertion groove 118 when the shift pedal 110 is manipulated by a foot to turn (swing) vertically from the predetermined neutral position (position indicated by solid lines) in FIG. 4 to move to positions indicated by the dashed line and the two-dot chain line (respectively, referred below to as "shift-down bodily sensation signal generating position" and "shift-up bodily sensation signal generating position").

That is, in the predetermined neutral position and in a position thereabout, the moving ball 164 comes into pressure contact with a wall surface of the shift pedal 110 (the arm portion 112), and such pressure applies a predetermined torque on a foot (that is, a left foot operating a shift change) operating the shift pedal. On the other hand, when the shift pedal 110 moves to the shift-down bodily sensation signal generating position or the shift-up bodily sensation signal generating position, the moving ball 164 is inserted into the insertion groove 118. At the time of such insertion, torque required for operative movement of the shift pedal 110 is momentarily changed and further torque is momentarily changed when the moving ball 164 is once fixed in the insertion groove 118. Such change is transmitted as bodily sensation signal (that is, a signal can be perceived by sensation of the body (e.g., here, a foot). The same is applied below.) to a rider. Specifically, such torque change is perceived as feeling of click through a foot's sensation by a rider.

An explanation will be given to function and effect, which can be produced as a result of the construction of the embodiment described above at the time of shift change.

First, in order to change a transmission in speed, a rider can turn (swing) the shift pedal 110 upward or downward with a foot until the arm portion 112 of the shift pedal 110 abuts against the respective stopper pins 106, 107.

At this time, one 131A of the rods is pushed by the push portion 112D of the shift pedal 110 to be elastically deformed. When a manipulating force on the shift pedal 110 by a foot is released, the shift pedal 110 is returned to the neutral position (predetermined position) indicated by solid lines in FIG. 4 by an elastic force of the rod 131A. In addition, as described above, when the shift pedal 110 comes to the position (shift-down bodily sensation signal generating position) indicated by the dashed line or the position (shift-up bodily sensation signal generating position) indicated by the two-dot chain line in FIG. 4, feeling of click is gotten by the operating force changing mechanism (plunger 160) constructed in a manner described above.

Also, turning of the shift pedal 110 causes the turning plate 124 to turn via the latch pin 116. At this time, it is detected by the sensor 122 that the shift pedal 110 has been turned in a predetermined direction, and its signal is transmitted to the engine control unit. According to the illustrated embodiment, output of a detection signal from the sensor 122 and timing, in which feeling of click is gotten, are synchronized with each other. Thereby, a rider can perceive the start of speed change control processing through the feeling of click by sensation of a foot although the speed change operation is performed by a foot as compared with a hand.

Then the shift actuator 23B is operated by a signal from the engine control unit and the shift shaft 23 (FIG. 2) is turned in a predetermined direction.

When the shift shaft 23 is turned in this manner, the shift cam 24 can be rotated via the ratchet mechanism 27 in a predetermined direction and the shift fork 22 is guided by the cam groove 24A to slide in a predetermined direction. Thereby, the slide gears of the transmission can be moved to bring about predetermined dog release and dog locking.

In addition, generally, when the number of speeds is decreased (perform shift-down), the shift pedal 110 is moved (turned) downward. On the other hand, when the number of speeds is increased (perform shift-up), the shift pedal 110 is turned upward.

With such arrangement, it is possible to readily perform shift operation with the same feeling of manipulation as conventional arrangement since manipulation of the shift pedal 110 by a foot is detected and the actuator is operated in an arrangement, in which a shift actuator is used to perform speed change operation.

Also, according to the embodiment, it is not necessary to connect the shift pedal 110 to the shift shaft 23 through a mechanical linkage unlike a conventional arrangement and the base plate 102, the shift pedal 110, the sensor 122, etc. constitute an integral or combined operation unit 100. Therefore, it is possible to readily perform mounting to the vehicle body frame 10 (or the engine casing 14) at the time of production. That is, it is possible to readily mount the base plate 102 in a predetermined position.

Also, since those members, which constitute the operation part 101 such as the shift pedal 110, the sensor 122, etc. and the detection unit 120, are made integral or coupled together as a unit, it is possible to readily adjust the sensor 122 and other equipments even before the operation unit 100, etc. are mounted to a vehicle side (the vehicle body frame 10, the engine casing 14, etc.).

Also, the return mechanism (specifically, the pine-needle shaped spring 131) to return the shift pedal 110 to a predetermined position (neutral position) can be provided to be made integral or coupled together with the operation unit 100. Owing to this, it is possible to further improve productivity (in particular, assembling of parts).

Since the operation unit 100 according to the illustrated embodiment can be detachably and integrally mounted or mounted as a unit to a vehicle, the workability of arrangement is favorable and even in the case where the shift pedal 110 is not connected to the shift shaft 23 through a linkage like a conventional arrangement, it can be readily returned to the neutral position.

Also, since the shift pedal 110 (that is, a moving part) and a potentiometer 68 (that is, a detection unit) are made integral together or combined together in a unit, detection to a certain extent is possible in spite of a position, in which the operation unit 65 is mounted to a vehicle. In other words, positional regulation of the shift pedal 110 can be readily performed according to a user's (rider's) favorite by changing a position of the operation unit 100.

Also, since parts manipulated by a foot are mounted to the base (the base plate 102) together, the detection mechanism can be improved in stiffness.

A detection mechanism (operation unit) 200, according to a second embodiment, of a speed change controller disclosed herein will be described with reference to FIGS. 6 to 10. The detection mechanism 200 according to this illustrated embodiment is configured such that a support plate 221 comprising a base mounting portion thereon and a detection unit 220 is arranged on a base plate 202 mounted to the vehicle body frame 10 to afford positional regulation.

Figure 8:
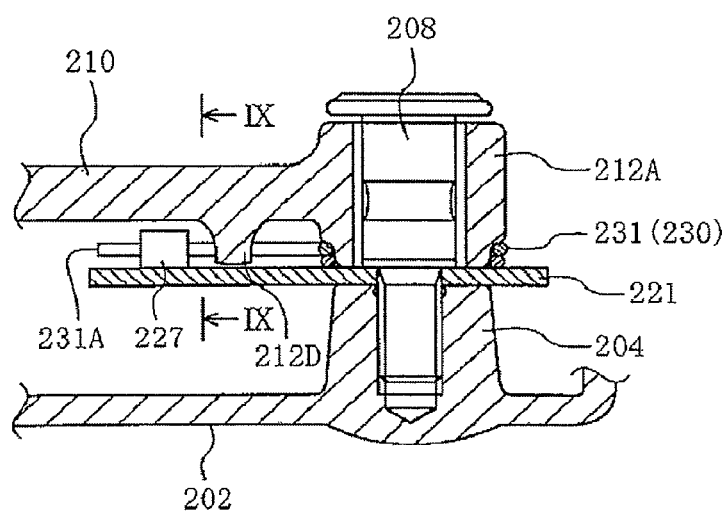
FIG. 8 is a cross sectional view taken along the line VIII-VIII in FIG. 6.
Figure 9:
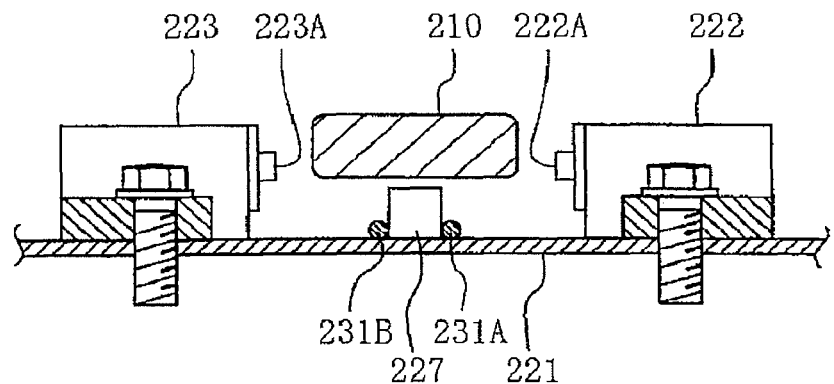
FIG. 9 is a cross sectional view taken along the line IX-IX in FIG. 8.
Figure 10:
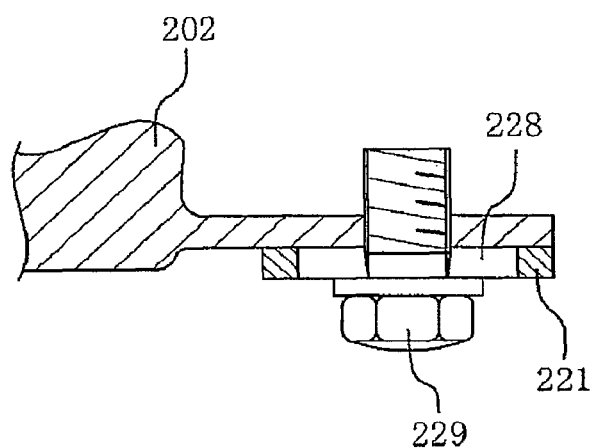
FIG. 10 is a cross sectional view taken along the line X-X in FIG. 6.

More specifically, as shown in FIG. 8, the support plate 221 together with a shift pedal (arm portion) 210 can be mounted pivotally to the base plate 202 by a single a screw member 208. Specifically, like the first embodiment, an end 212A of the shift pedal (arm portion) 210 can be mounted to a boss 204 of the base plate 202 by the screw member 208 in the vicinity of a foot rest 9 (that is, a foot rest mount 203) to freely turn (specifically, being able to swing in two vertical directions). That is, the shift pedal can be mounted to be able to swing in two directions (here, a vertical direction) in the same manner as in general motorcycles. Also, the shift pedal 210 can be rotated an appropriate amount about the screw member 208 in either direction to be regulated in position and angle relative to a vehicle as described later.

A slot 228 can be formed on an end of the support plate 221. The slot 228 can be open-shaped and can correspond to an arcuate shape about the screw member 208. A mount bolt 229 can extend through and can be arranged in the slot 228. The mount bolt 229 can be threaded into a predetermined mount hole provided in the base plate 202 whereby the support plate 221 is fixed in a predetermined position and at a predetermined angle.

Figure 6:
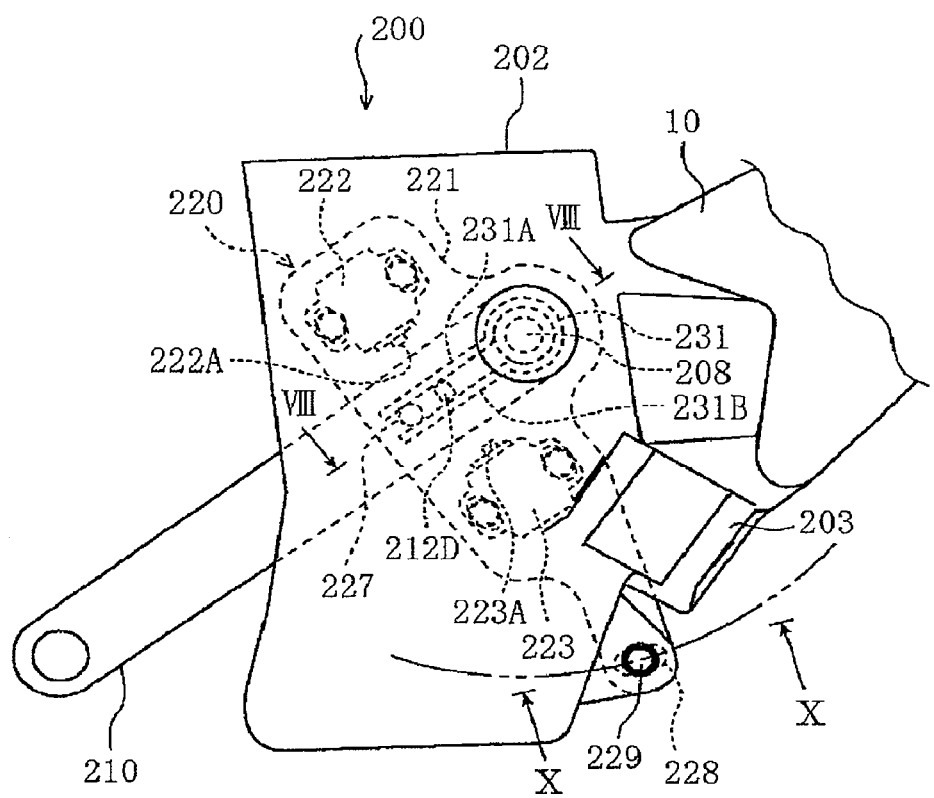
FIG. 6 is a side view showing a state, in which a shift pedal or the like according to a second embodiment is arranged.
Figure 7:
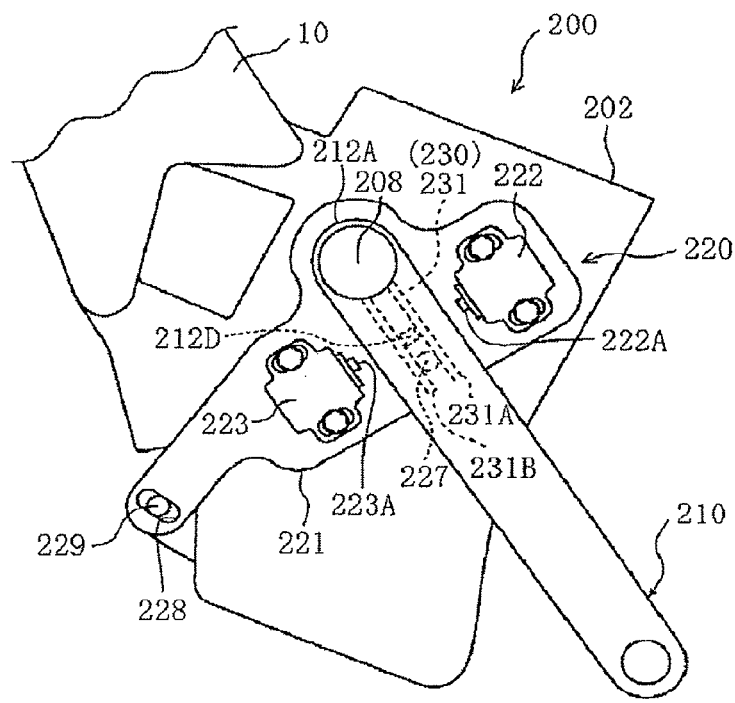
FIG. 7 is a rear view of FIG. 6 according to the second embodiment.

As shown in FIGS. 6 and 7, a pair of shift pedal (detection) switches 222, 223, which can form a "detection unit" in the illustrated embodiment can be arranged in positions close to both sides of the shift pedal 210 on the support plate 221. As a result of providing the shift pedal (detection) switches 222, 223 in such positions, the shift pedal 110 is turned (moved) in either sense in a vertical direction from a predetermined reference position (neutral position) to abut against either of the shift pedal switches 222, 223, so that contact portions 222A, 223A of the switches 222, 223 are pressed and pushed in whereby a switch ON state comes out. Here, when the shift pedal 210 is pushed up upward by a foot, the switch 222 thus abutted is a shift-up detection switch 222, and when the shift pedal 210 is pushed down upward by a foot, the switch 223 thus abutted is a shift-down detection switch 223. In addition, as apparent from the figure, according to the embodiment, the switches 222, 223 can also function as stopper that restricts excessive movement (turning) of the shift pedal 210.

A return mechanism 230 can be provided on a speed change controller according to the illustrated embodiment in the same manner as in the first embodiment. That is, a pine-needle shaped spring 231 can be provided on the shift pedal 210 as shown in FIG. 8. The pine-needle shaped spring 231 can comprise a pair of rods (straight ends) 231A, 231B to generate spring elasticity. Interposed between the pair of rods 231A, 231B can be a push portion 212D protrusively provided on the shift pedal 210. Also, a latch projection 227 can be formed on the support plate 221 to be inserted between the pair of rods 231A, 231B. With such construction, when the shift pedal 210 is turned (moved) by manipulation of a foot, one 231A of the rods can be elastically deformed by the push portion 212D and the other 231B of the rods is elastically deformed by the latch projection 227. In the case where manipulation by a foot is released, the shift pedal 210 can be returned to a predetermined reference position (neutral position) shown in the figure by the existence of the push portion 212D and the latch projection 227 and an elastic force of the pine-needle shaped spring 231.

With the detection mechanism (operation unit) 200 constructed in a manner described above, the support plate 221 can be turned about the screw member 208 by loosening the mount bolt 229, so that positional regulation of the shift pedal switches 222, 223 relative to the shift pedal 210 can be readily performed.

Also, the shift pedal detection switches 222, 223, the shift pedal 210, the pine-needle shaped spring 231, etc. can be readily exchanged together by removing the support plate 221 from the base plate 202.

Also, the detection switches 222, 223 of this kind can be relatively inexpensive and can contribute to reduction in cost.

In addition, the construction, function and effect except those described above are the same or substantially the same as those in the first embodiment and so an explanation therefor is omitted.

Figure 11:
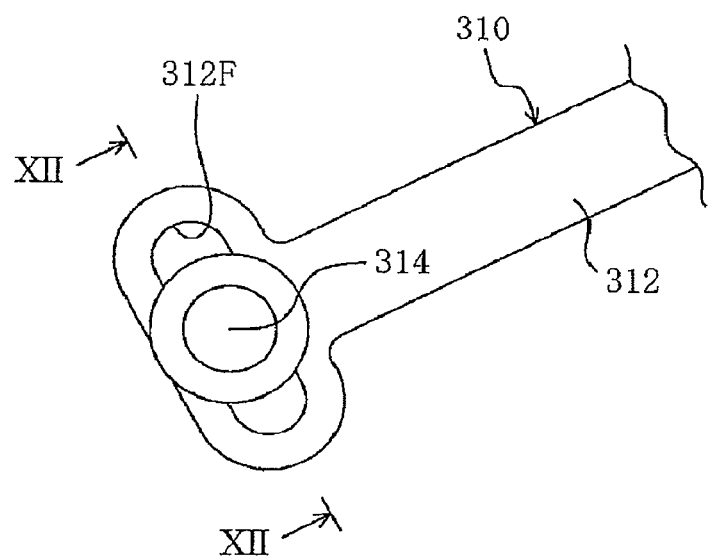
FIG. 11 is a view showing a tip end of a shift pedal according to a third embodiment.
Figure 12:
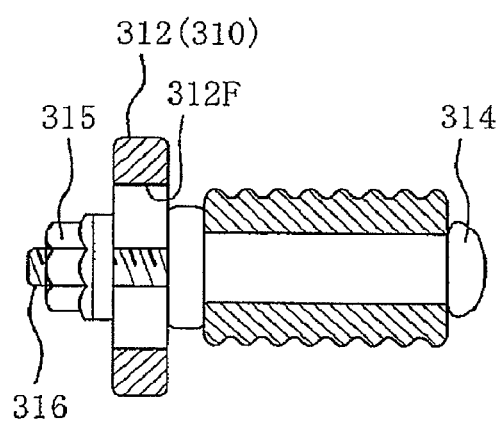
FIG. 12 is a cross sectional view taken along the line XII-XII in FIG. 11.

With reference now to FIGS. 11 and 12, an explanation will be given to a third embodiment a speed change controller disclosed comprising a variable mechanism capable of changing a position of that portion (here, a pedal portion of a shift pedal) on an operation part, which is directly manipulated by a foot, relative to a vehicle.

According to this illustrated embodiment, a slot 312F is formed at a tip end of a shift pedal 310 (arm portion 312). A pedal portion (pushed portion) 314 is mounted to the slot 312F by a nut 315 and other implement (for example, a screw), which can be clamped.

Specifically, a male thread portion 316 can be protrusively provided on the pedal portion (pushed portion) 314, the male thread portion 316 being inserted into the slot 312F to be threaded on the nut 315.

As a result of such construction, the male thread portion 316 can be moved in the slot 312F by loosening the nut 315. Therefore, a rider can regulate the pedal portion (pushed portion) 314 in a favorite position.

In addition, the construction, function and effect except those described above are the same or substantially the same as those in the first or second embodiment and so an explanation therefor is omitted.

While according to the respective embodiments the moving part and that portion, which is directly manipulated by a foot, on the operation part are the same (that is, a shift pedal) from the viewpoint of simplicity (a small number of parts) in construction, readiness in assembly/adjustment, etc., a moving part and that portion, which is directly manipulated by a foot, included in an operation unit may be made of separate parts in another embodiment.

Subsequently, a fourth embodiment of a speed change controller disclosed herein will be described with reference to FIGS. 13 to 15. The embodiment is a example of a configuration, in which a moving part, of which movement is detected by a detection unit, and a shift pedal directly manipulated by a foot are arranged in separate regions.

Specifically, in the illustrated embodiment, a shift pedal 410 and an operation unit 400 are connected to each other by a link member 50.

According to the illustrated embodiment, a sensor unit 400 is provided as a unit connected to "operation unit" described above that includes the moving part, the detection unit, and a base, which supports the units. In one embodiment, the sensor unit can be generally constructed in the same manner as the operation unit 200 of the second embodiment described above.

The sensor unit 400 comprises a support plate 402 corresponding to "base" detachably mounted to an engine casing 14. The support plate 402 is mounted to the engine casing 14 by engagement of a mount screw (not shown) and a mount hole corresponding to the screw. Here, the mount hole is formed to be made a little larger than a thread diameter whereby some positional regulation relative to the engine casing 14 is made possible.

A lever member 408 comprises a moving part, which can move upon manipulation (that is, based on manipulation of a foot) by a foot, is provided on the support plate 402 to be able to turn about a shaft 409.

Figure 13:
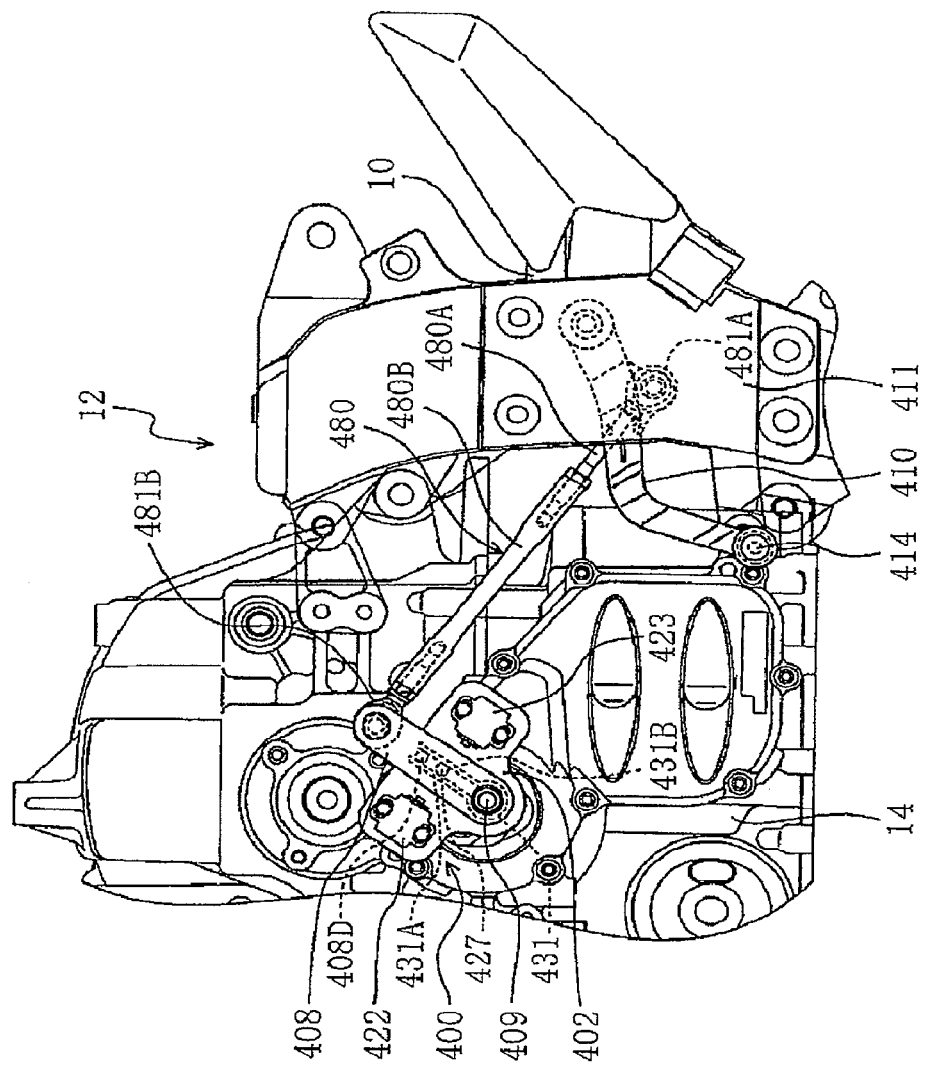
FIG. 13 is a side view showing an engine side according to a fourth embodiment.

As shown in FIG. 13, a pair of shift pedal (detection) switches 422, 423 as "detection unit" are arranged in positions close to both sides of the lever member 408. As a result of providing the shift pedal (detection) switches 422, 423 in such positions, a shift pedal 410 described later is turned (moved) in either sense in a vertical direction, and the lever member 408 is linked with such movement to abut against either of the shift pedal switches 422, 423, so that contact portions of the switches 422, 423 are pressed and pushed in whereby a switch ON state comes out. In addition, the construction of the shift pedal (detection) switches 422, 423 is the same as that in the second embodiment and so an explanation of a detailed construction is omitted.

Figure 15:
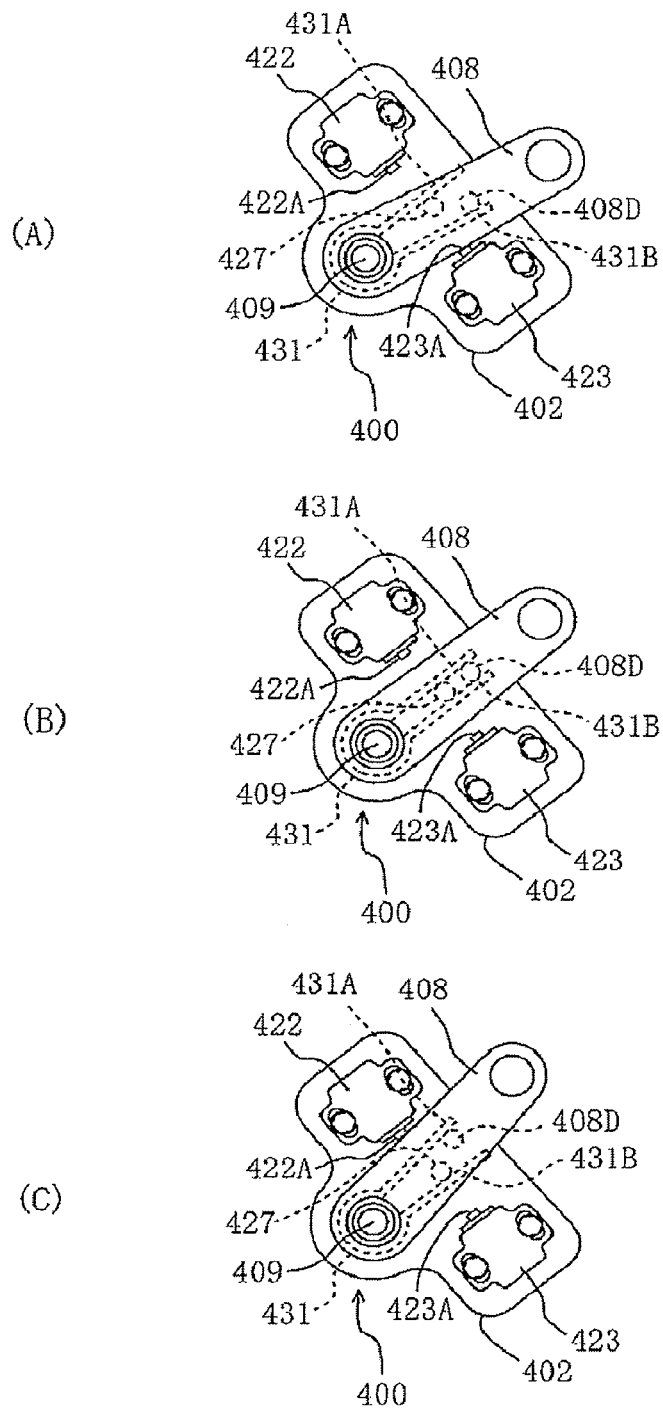
FIGS. 15(A), 15(B), 15(C) are front views showing an operation of a sensor unit according to the fourth embodiment, FIG. 15(A) showing a state (shift-down operating state), in which a lever member is moved (turned) downward, FIG. 15(B) showing a state, in which the lever member is in a neutral position, and FIG. 15(C) showing a state (shift-up operating state), in which the lever member is moved (turned) upward.

As shown in FIG. 15, the lever member 408 can be formed with a push portion 408D, which can be inserted between a pair of rods 431A, 431B of a pine-needle shaped spring 431. Also, a latch projection 427 can be formed on the support plate 402 to be inserted between the pair of rods 431A, 431B. With such construction, when the shift pedal 410 is turned (moved) by manipulation of a foot, one 431A of the rods is linked with such motion to be elastically deformed by the push portion 408D and the other 431B of the rods is elastically deformed by the latch projection 427. In the case where manipulation by a foot is released, the lever member 408 can be returned to a predetermined reference position shown in the figure by the existence of the push portion 408D and the latch projection 427 and an elastic force of the pine-needle shaped spring 431.

Also, as shown in FIG. 13, there cam be provided a rod-shaped link member 480, by which the shift pedal 410 mounted pivotally on a base plate 411, and the above-mentioned lever member 408 (moving part) can be linked with each other. Specifically, an end 481A of the link member 480 can be connected pivotally to the shift pedal 410 and the other end 481B is connected pivotally to the lever member 408. Also, the link member 480 can comprise a cylindrical portion 480B and a shaft portion 480A insertable into the cylindrical portion 480B to be constructed to afford regulation of its total length.

Further, an end 23A of the shift shaft 23 (see e.g. FIG. 2) projects to a position in the vicinity of a tip end of the lever member 408 from the engine casing 14, and an end 492A of an arm member 492 is mounted to the end 23A. Also, as shown in FIG. 14, the other end 481B of the link member 480 can be made detachable to the other end 492B of an arm member 492.

As a result of such construction, when the shift pedal 410 (specifically, a pedal portion 414) is manipulated by a foot in a state, in which the other end 481B of the link member 480 shown in FIG. 13 is mounted to the tip end of the lever member 408, the lever member 408 can be turned through the link member 480 in a predetermined direction. Turning is made downward as shown in FIG. 15(a) or upward as shown in FIG. 15(c) from, for example, a neutral position shown in FIG. 15(b). Therefore, like the embodiment described above, in which the shift pedal itself is a moving part, the lever member 408 abuts against one 422 or 423 of the shift pedal detection switches to bring about an ON state, and its detection signal is transmitted to the engine control unit. An actuator 23B is actuated by the engine control unit and the shift shaft 23 turns to perform shift operation.

Figure 14:
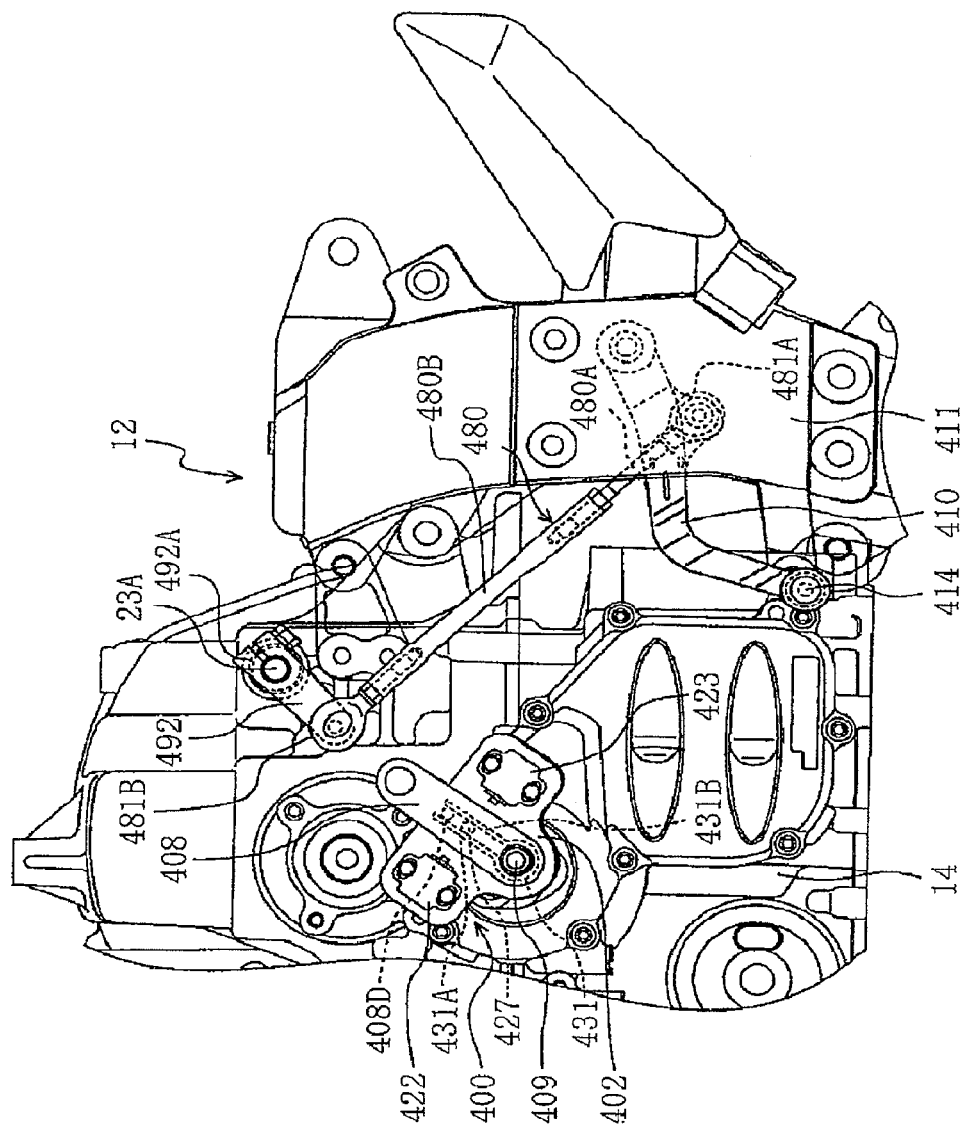
FIG. 14 is a side view showing an engine side in the case where a link member according to the fourth embodiment is connected to an arm member side.

On the other hand, as shown in FIGS. 13 and 14, it is possible to remove the other end 481B of the link member 480 from the lever member 408 to mount the same to the other end 492A of the arm member 492. Thereby, when the shift pedal 410 is turned by manipulation of a foot, the arm member 492 connected to the shift shaft 23 is turned through the link member 480. Turning of the arm member 492 causes the shift shaft 23 to be turned in a predetermined direction, so that shift operation is performed mechanically (that is, in the same manner as in a conventional motorcycle).

The link member 480 can be selectively mounted to the lever member 408 or the arm member 492 in this manner whereby it is possible to select the case where an actuator is used to electrically perform speed change (shift) operation and the case where shift operation is performed mechanically without the use of an actuator. Thereby, direct, mechanical speed change operation can be performed by manipulation of a foot in the case where an actuator is in failure.

According to the illustrated embodiment, the case where operation is performed by the sensor unit 400 and the case where operation is performed mechanically is switched only by changing mounting of the link member 480 and it is unnecessary to regulate the shift pedal 410 when such change is made, so that it is possible to readily and rapidly perform the change In addition, the construction, function and effect except those described above are the same or substantially the same as those in the first or second embodiment and so an explanation therefor is omitted.

Subsequently, a modified example (a fifth embodiment) of the operation unit of the first embodiment will be described with reference to FIGS. 16 and 17.

In addition, only matters featuring the present embodiment are described in detail and the same construction as that in other embodiments is not duplicately described. Those skilled in the art can understand the other components of the present embodiment on the basis of other portions in the specification of the present application and contents of respective drawings referred to in the explanation.

Figure 16A:
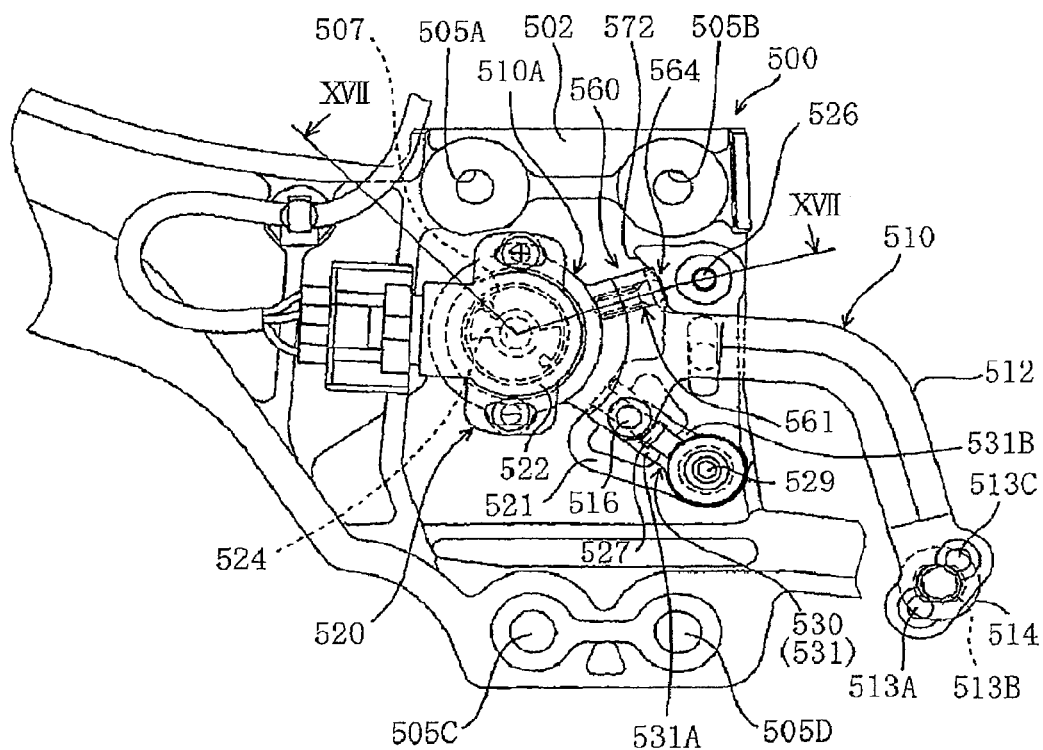
FIG. 16A is a side view showing a state, in which a shift pedal or the like according to a fifth embodiment is arranged.
Figure 16B:
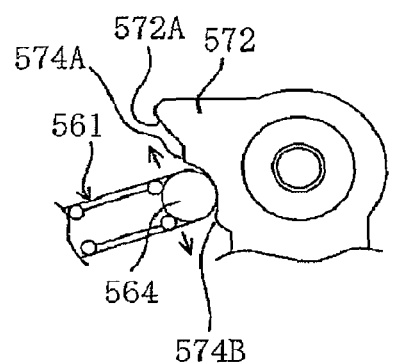
FIG. 16B is a view schematically illustrating a main part of an operating force changing mechanism of FIG. 16A.
Figure 17:
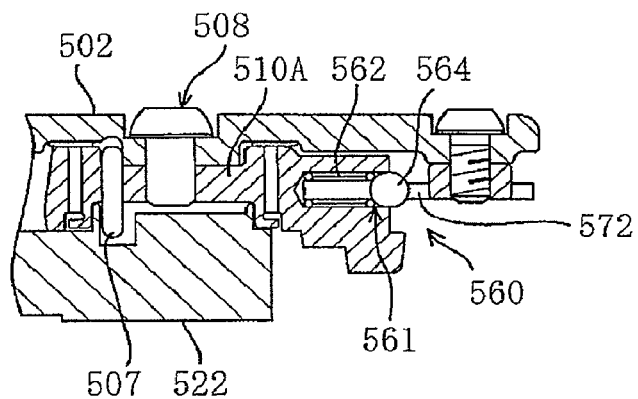
FIG. 17 is a cross sectional view taken along the line XVII-XVII in FIG. 16A.

FIGS. 16A and 16B show the construction of a detection mechanism (operation unit) 500 according to the present illustrated embodiment, as viewed from an inner surface side (a side facing a vehicle) of a base plate 502 at the time of mounting to a vehicle in contrast to FIG. 4. The base plate 502 corresponding to "base" is a substantially rectangular-shaped plate and mounted to a vehicle body frame (or an engine casing) through mount holes 505A to 505D in four locations in total by screws (not shown) as shown in FIG. 16A. The mount holes can be formed to be a little larger in diameter than a thread diameter. Thereby, positional adjustment relative to the vehicle body frame (or the engine casing) can be made possible.

Mounted to the base plate 502 is a shift pedal 510, which is an operation part and corresponds to a moving part according to this embodiment. The shift pedal 510 comprises an arm portion 512, of which one end 510A (referred below to as "pedal arm base 510A") is mounted pivotally to an inner surface side of the base plate 502, and a pedal portion 514, which is mounted to a tip end of the arm portion 512 to be manipulated directly by a foot (a toe tip). Mount holes 513A to 513C can be provided in three locations in total on the arm portion 512 to permit mounting of the pedal portion 514 by screws (or bolt), so that it is possible to regulate a position of the pedal portion according to a rider's body type and preference. In FIG. 16A, the pedal portion 514 is mounted to the centrally positioned mount hole 513B.

The pedal arm base 510A is mounted to the base plate 502 by a screw member 508 to be able to turn (specifically, being able to swing in two vertical directions) about the screw member 508 as a rotating shaft. The pedal arm base 510A comprises an operating force changing mechanism (capable of functioning as a bodily sensation signal generating mechanism) described later. Also, a detection unit 520 is mounted coaxial with the pedal arm base 510A. That is, as shown in FIG. 16, with the operation unit 500 according to the embodiment, the detection unit 520 is provided on the inner surface side of the base plate 502 to be coaxial with the shift pedal 510 unlike the first embodiment described above.

The detection unit 520 comprises a sensor (here, a non-contact type magnetic rotation potentiosensor) 522 that detects that the shift pedal (moving part) 510 is moved a predetermined amount or more by manipulation of a foot. The sensor 522 can comprise a lever portion (probe) 524 and a drum-shaped magnetic resistance element (not shown). On the other hand, a plurality of pins 507 can be provided in positions close to the lever portion 524.

With such construction, when the shift pedal 510 is turned (moved) in either sense in a vertical direction according to a rider's shift change operation, the sensor 522 mounted coaxial with the shift pedal 510 will turn (move) simultaneously but one of the pins 507 abuts against the lever portion 524 to inhibit turning of the lever portion 524. As a result, the relative positional relationship of the magnetic resistance element and the lever portion (probe) 524 changes. Voltage change corresponding to such rotational displacement is generated and a detection signal based on the change is output. The lever portion 524 comprises an automatic return mechanism composed of a spring (not shown), etc., and is automatically returned to a predetermined position in case of no contact by the pin 507.

In addition, a detection signal can be transmitted to the engine control unit (ECU) and a speed change mechanism operates according to the detection signal but a duplicate explanation is omitted since a manner of such operation is the same as that in the first embodiment described above.

The detection unit 520 described above is provided on the inner surface side of the base plate 502 whereby an inadvertent contact between a rider's foot and the detection unit 520 (in particular, a body of the sensor 522) is prevented and breakage and failure of the detection unit due to such contact can be beforehand prevented. Also, the shift pedal 512 and the sensor 522 are mounted coaxially to the base plate 502 whereby it is possible to reduce members for mounting in number and processes required for mounting.

Also, a support plate 521 can be arranged in a position close to the arm portion 512 of the shift pedal 510 on the inner surface side of the base plate 502. The support plate 521 can be screwed to the base plate 502 through mount holes 526, 529 in two locations.

As shown in FIG. 16A, a pine-needle shaped spring 531 can act as "return mechanism 530", which returns the shift pedal 510 to a predetermined neutral position, is provided on one 529 of the mount holes. Formed between a pair of rods (straight ends) of the pine-needle shaped spring 531 is a latch projection 527, which is protrusively provided on a part (push portion) 516 of the arm portion 512 of the shift pedal 510 and the support plate 521. With such construction, when the shift pedal 510 is turned (moved) by manipulation of a foot, one of the rods is elastically deformed by the push portion 516 and the other of the rods is elastically deformed by the latch projection 527. In the case where manipulation by a foot is released, the shift pedal 510 can be returned to a predetermined position shown in the figure by the existence of the push portion 516 and the latch projection 527 and an elastic force of the pine-needle shaped spring 531.

Unlike the respective embodiments described above, according to the embodiment, the spring 531, which constitutes the return mechanism 530, is mounted in a different position from the shift pedal 510 and a mount shaft of the sensor 522. Thereby, it is possible to construct a compact return mechanism without mounting a large diameter spring to the shift pedal 510 and the mount shaft of the sensor 522.

Subsequently, an explanation will be given to an operating force changing mechanism 560 according to the embodiment. As shown in FIGS. 16A, 16B and 17, the same plunger 561 as that described in the first embodiment can be embedded, as a preferred example of the resistance portion provided in the operating force changing mechanism 560 according to the embodiment, in the arm base 510A of the shift pedal 510. As shown in the figure, a coil spring 562, which is a spring portion of the resistance portion according to the embodiment, can be inserted into a cylindrical-shaped body of the plunger 561, and a moving ball 564 being a surface portion connected to the spring 562 is mounted to a tip end of the plunger 561. The moving ball 564 is supported by the spring 562 such that when the moving ball 564 is pushed axially of the cylindrical-shaped body with a predetermined force or more, the spring 562 yields to the push force to contract with the result that the moving ball 564 retreats into the cylindrical-shaped body. On the other hand, when such push disappears, the spring 562 is elongated by elasticity and the moving ball 564 returns to an original position at the tip end of the plunger 561. According to the embodiment, a tip end portion of the moving ball 564 is exposed outside in a normal state (FIG. 17).

On the other hand, a slide wall portion 572 is formed, as a preferred example of the abutting portion provided in the operating force changing mechanism according to the embodiment, in a position on the support plate 521, in which it can contact with the moving ball 564 of the plunger 561.

As shown in FIG. 16B, specifically, the slide wall portion 572 is formed with a slide surface 572A, against which the moving ball 564 is pushed by an elastic force of the plunger 561. In the case where the shift pedal 510 is turned (moved) vertically by manipulation of a foot from a predetermined neutral position (position shown in FIG. 16A), the moving ball 564 slides vertically (a direction indicated by an arrow in FIG. 16B) correspondingly.

Here, as shown in FIG. 16B, convex portions 574A, 574B are formed in positions (corresponding to the shift-down bodily sensation signal generating position and the shift-up bodily sensation signal generating position in the first embodiment), to which the moving ball 564 is moved immediately before the potentiosensor 522 detects that the shift pedal 510 has been turned in a predetermined direction, on the slide surface 572A.

That is, in a predetermined neutral position, in which shift operation is not performed, and a position therearound, a predetermined torque (reference torque) is given to the moving ball 564 to enable sliding on the slide surface 572A of the slide wall portion 572. The torque (pressure) is transmitted to a rider through a foot (that is, a left foot performing shift change operation), which performs shift pedal operation.

On the other hand, when the shift pedal 510 moves to the shift-down bodily sensation signal generating position or the shift-up bodily sensation signal generating position, the moving ball 564 comes into contact with the convex portions 574A, 574B formed the slide surface. At this time, the reference torque cannot cause the moving ball 564 to get over the convex portions 574A, 574B and sliding of the moving ball 564 is impeded in the position. Also, such matter is transmitted to a rider through a foot. Here, a rider heightens torque being given to the shift pedal 510 to increase pressure applied to the moving ball 564 whereby the spring 562 contracts and the moving ball 564 can get over the convex portions 574A, 574B while retreating. When the convex portions 574A, 574B are gotten over, pressure on the moving ball 564 rapidly decreases. Such series of phenomena are transmitted, as a change (that is, high torque from the reference torque and then to low torque) in torque received from the shift pedal 510, to a rider. That is, the phenomena are transmitted as bodily sensation signal to a rider. Specifically, a rider perceives such change in torque as feeling of click through a foot's, sensation.

According to the embodiment, timing, in which such feeling of click is obtained, and timing, in which a detection signal is output from the sensor 522, synchronize with each other. Thereby, a rider can perceive the start of speed change control processing through a foot's sensation by the feeling of click (a change in torque) although the speed change operation is performed by a foot being dull as compared with a hand. Then the embodiment is the same as the other embodiments in that the shift actuator is operated by a signal from the engine control unit and the shift shaft 23 (FIG. 2) is turned in a predetermined direction.

According to the embodiment, the operating force changing mechanism can be constructed compact by providing the plunger 561 on the shift pedal.

Also, substantially all detection mechanisms including the operating force changing mechanism are provided on the base plate 502 whereby it is possible to realize both an improvement in productivity and in maintenance.

While the speed change controller described in the second embodiment is constructed such that the pair of shift pedal (detection) switches 222, 223 are used as a detection unit and that contact portions 222A, 223A of the shift pedal switches 222, 223 are pressed and pushed in by a part of the shift pedal whereby a switch ON state comes out, use of such switches is not limitative.

Figure 18:
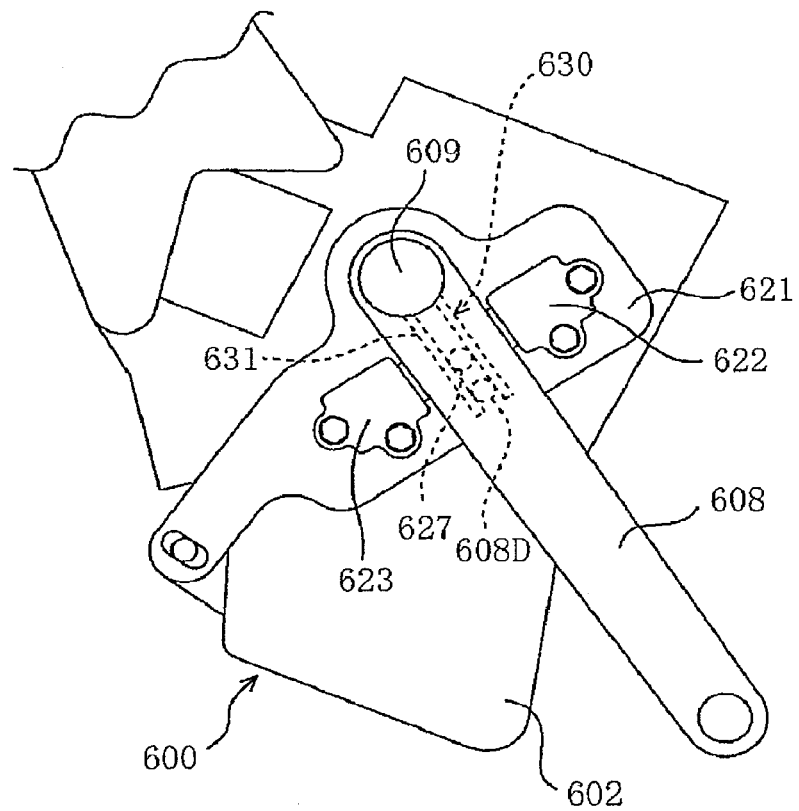
FIG. 18 is a side view showing a state, in which a shift pedal or the like according to a sixth embodiment is arranged.

For example, according to a sixth embodiment, like a detection mechanism (operation unit) 600, as a sixth embodiment, shown in FIG. 18, load switches 622, 623, which detect a load on an operation portion, may contact with both upper and lower surfaces of a shift pedal 608. In this case, a detection signal related to shift operation (speed change processing) is output when pedal manipulation by a foot applies a predetermined load on the shift pedal 608 corresponding to a loaded portion, on which a load is applied. Here, the load switch 622 reacting when a foot applies a load on the shift pedal 608 upward is a shift-up detection switch 622, and the load switch 623 reacting when a foot applies a load on the shift pedal 608 downward is a shift-down detection switch 623.

According to the embodiment, since the shift pedal 608 is arranged in a state of being interposed substantially closely between the pair of load switches 622, 623, inconvenience such as gutter, etc. is not generated on the shift pedal and a stable assembling can be made. Also, the load switches 622, 623 being a detection unit and the shift pedal 608 being a loaded portion are provided on a base plate 602 (here, further a support plate 621 provided detachably on the base plate 602) provided detachably on a vehicle whereby the respective parts can be given stiffness affording application of a large load to such a degree that a rider can grasp feeling of operation although operation is performed by a foot being dull as compared with a hand. Also, it is possible to achieve an improvement in mechanism stiffness and an improvement in productivity and in maintenance.

In addition, other components (for example, (1) the base plate 602, (2) the support plate 621, (3) a pine-needle shaped spring 631, a push portion 608D, and a latch projection 627, which constitute a return mechanism 630 (here, functions as a holding mechanism that holds a pedal position), and (4) a screw member 609 that mounts the shift pedal 608 to the support plate 621) shown in FIG. 18 are the same in construction as those in the second embodiment.

Various embodiments other than the embodiments described above can be adopted in embodying the invention.

For example, while a lever-shaped shift pedal manipulated by a tip of a toe of a foot having a shape common to sport type motorcycles is used as an operation part or a moving part, it is not limitative but other shape will do provided that a shift pedal is manipulated by a foot. For example, a shift pedal may be in the form of a wide plate, on which a foot is put, as used in American type motorcycles.

Also, while a base (base plate), which constitutes an operation unit, is mounted to the vehicle body frame 10 (or the engine casing 14) in the respective embodiments, this is not limitative but it may be mounted to an appropriate portion (for example, a power source such as engine, motor, etc., other constituents of a vehicle such as transmission, etc., or accessory members such as under-cowling, engine guard, etc.) according to shape and kind of a vehicle.

Also, a spring used in a return mechanism is not limited to the pine-needle shaped spring described above but may assume any configuration as far as a desired return mechanism can be constituted. For example, a bent leaf spring will do.

Also, while the third embodiment described above teaches an arrangement, which is composed of a slot and a screw, as a preferred example of a variable mechanism capable of changing a position of that portion (specifically, a pedal portion of a shift pedal) on an operation part, which is directly manipulated by a foot, relative to a vehicle, this is not limitative. For example, a mechanism will do, in which an arm portion of a shift pedal is composed of a two-piece or three-piece or more rod, which is adjustable in length, and a length of the rod (arm portion) is regulated according to a rider's body type and favorite.

Also, while according to the respective embodiments described above the shift pedal (the moving part of the operation part) are moved (turned) in two vertical directions in the same manner as in conventional motorcycles, a direction, in which the moving part on the operation part or the part directly manipulated by a foot in the speed change controller of the invention is moved, is not limited to two vertical directions. Such direction may be a longitudinal direction or a left and right direction (for example, a direction approaching a vehicle body or a direction away from a vehicle body) of a driver's foot with a ride posture as a reference.

Also, the devices described above, which realizes an operating force changing mechanism, is not limited to the plunger constructed in the manner described above. For example, one of the resistance portion and the abutting portion is made of a magnet and the other is made of a magnetic material (iron, or the like) whereby torque can be changed by a magnetic force when the detection unit detects shift operation.

Also, while the resistance portion (plunger) described above comprises a coil spring as a spring portion in a body thereof, this configuration is not limitative. For example, the resistance portion may comprise a piston member, a part of which is exposed to a surface thereof by making use of elasticity of volume of gases and filling gases such as air or the like therein.

Also, a speed change mechanism, which constitutes the speed change controller of the invention, is not limited to a constantly meshing type multistage speed change mechanism but may be one, which can operate on the basis of speed change operation detected by a detection mechanism. For example, a V-belt type continuously variable transmission controlled by a motor is suited to a speed change mechanism, which constitutes the speed change controller of the invention.

As described above, in one embodiment, a speed change controller for saddle-type vehicle includes an operation unit that comprises an operation part, which is manipulated by a foot, and a detection part, which detects manipulation by a foot and is detachably and mounted as a unit to the vehicle.

An advantage of this embodiment, is that because an operation unit provided integrally with an operation part, which is manipulated by a foot, and a detection part, which detects manipulation by a foot, is detachably and integrally mounted to a vehicle, shift operation can be readily performed in the same feeling of operation as conventional one because manipulation by a foot is detected and an actuator is operated in an arrangement, in which a shift actuator is used to perform speed change operation.

Also, since it is not necessary to connect an operation part, which is manipulated by a foot, to a shift shaft through a linkage unlike a conventional arrangement and the operation part and the detection part constitute an integral operation unit, it is possible to readily perform mounting to a vehicle at the time of production.

Further, since the operation part and the detection part are made integral or formed as a unit, it is possible to adjust the detection part even before the operation unit, etc. are mounted to a vehicle. Incidentally, in the case where the operation part and the detection part are separately mounted to a vehicle, it is necessary to manipulate the operation part after being mounted to a vehicle to regulate the detection part.

Furthermore, since the operation part and the detection part are made integral, certain detection can be made irrespective of a position of the operation part, so that positional regulation of the operation part can be readily performed according to a user's favorite only by changing a position of the operation unit.

In another embodiment, a speed change controller for saddle-type vehicles includes a base, a moving part supported on the base and moved by manipulation by a foot, a detection part, which detects manipulation by a foot, and a return mechanism, which returns the moving part to a predetermined position. These components can be coupled together as a unit to form an operation unit. The operation unit can be detachably and mounted to a vehicle body or an engine as a unit.

An advantage to this embodiment is that since a base, a moving part supported on the base and moved by manipulation by a foot, a detection part, which detects manipulation by a foot, and a return mechanism, which returns the moving part to a predetermined position, is provided integrally to form an operation unit, and the operation unit is detachably and integrally mounted to a vehicle body or an engine, it is possible to readily perform mounting to a vehicle at the time of production described above and it is possible to adjust the detection part even before the operation unit, etc. are mounted to a vehicle. Besides, since the moving part and the detection part are made integral, certain detection can be made irrespective of a position of the operation unit, so that positional regulation of the moving part can be readily performed according to a user's favorite only by changing a position of the operation unit. Also, since a return mechanism, which returns the moving part to a predetermined position (neutral position), is provided integrally on the operation unit, and detachably and integrally mounted to a vehicle, the workability of arrangement is favorable and even in the case where the moving part is not connected to the shift shaft through a linkage like a conventional arrangement, it can be readily returned to the neutral position.

In another embodiment, a speed change controller for saddle-type vehicle, in which a moving part moved by manipulation by a foot, a detection part, which detects manipulation by a foot, and a return mechanism, which returns the moving part to a predetermined position, are detachably provided on a vehicle body or an engine.

According to this embodiment since the moving part moved by manipulation by a foot, the detection part, which detects manipulation by a foot, and the return mechanism, which returns the moving part to a predetermined position, are detachably provided on a vehicle body or an engine so that respective parts are mounted with a vehicle body or an engine as a reference, it is possible to decrease a mount error and even in the case where the moving part is not connected to the shift shaft through a linkage like a conventional arrangement, it can be readily returned to the neutral position since the return mechanism, which returns the moving part to a predetermined position (neutral position), is provided.

In yet another embodiment, a speed change controller for saddle-type vehicles includes a sensor unit comprising a lever member mounted pivotally to a support plate and a detection part, which is made ON by turning of the lever member. The unit is arranged on a vehicle body or an engine. A link member for connection of the lever member and a shift pedal is provided, and an end of the link member can be removed from the lever member and attached to an arm member provided on a shift shaft.

According to this embodiment, since a sensor unit including a lever member mounted pivotally to a support plate and a detection part, which is made ON by turning of the lever member, is arranged on a vehicle body or an engine, a link member for connection of the lever member and a shift pedal is provided, and an end of the link member can be removed from the lever member and attached to an arm member provided on a shift shaft, the link member can be used to afford selectively mounting to the lever member or the arm member whereby it is possible to select the case where an actuator is used to electrically perform shift operation and the case where shift operation is performed mechanically without the use of an actuator. Thereby, mechanical speed change operation can be performed by manipulation of a foot when an actuator is in failure. Besides, the case where operation is performed by the sensor unit and the case where operation is performed mechanically is switched only by changing mounting of the link member and it is unnecessary to regulate the operation part when such change is made, so that it is possible to readily and rapidly perform the change.

According to the embodiments described herein, it is possible to provide a saddle-ride type vehicle provided with a speed change controller, in which manipulation by a rider's foot is improved.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A straddle-type vehicle comprising:
   an engine case;
   a transmission arranged in the engine case;
   a speed change controller including a detection mechanism configured to detect a speed change of the transmission initiated by a driver, the detection mechanism including a shift pedal to be operated by a foot of the driver and a detection unit that detects an operation of the shift pedal, the shift pedal and the detection unit being arranged outside of the engine case; and
   a speed change mechanism including a shift actuator arranged to perform the speed change of the transmission, the shift actuator being arranged to perform the speed change based on a signal from the speed change controller.

2. The straddle-type vehicle as recited in claim 1, further comprising a return mechanism configured to return the shift pedal to a neutral position, the return mechanism being arranged outside of the engine case.

3. The straddle-type vehicle as recited in claim 1, further comprising a stopper mechanism configured to restrict a moving range of the shift pedal, the stopper mechanism being arranged outside of the engine case.

4. The straddle-type vehicle as recited in claim 1, wherein the detection unit is attached to the engine case.

5. The straddle-type vehicle as recited in claim 4, wherein the detection mechanism includes a base portion, and the detection unit is attached to the engine case via the base portion.

6. The straddle-type vehicle as recited in claim 5, further comprising a return mechanism configured to return the shift pedal to a neutral position, wherein the detection unit, the return mechanism, and the shift pedal are supported by the base portion.

7. The straddle-type vehicle as recited in claim 1, wherein the detection unit is attached to a vehicle frame.

8. The straddle-type vehicle as recited in claim 7, wherein the detection mechanism includes a base portion, and the detection unit is attached to the vehicle frame via the base portion.

9. The straddle-type vehicle as recited in claim 8, further comprising a return mechanism configured to return the shift pedal to a neutral position, wherein the detection unit, the return mechanism, and the shift pedal are supported by the base portion.

10. The straddle-type vehicle as recited in claim 1, wherein the detection unit is configured to detect that the shift pedal is rotated by a predetermined amount or more.

11. The straddle-type vehicle as recited in claim 10, wherein the detection unit includes a potentiometer.

12. The straddle-type vehicle as recited in claim 10, wherein the detection mechanism includes two switches arranged to detect movements in two different directions.

13. The straddle-type vehicle as recited in claim 1, wherein the detection unit is configured to detect a load applied by the operation of the shift pedal.

14. The straddle-type vehicle as recited in claim 1, wherein the detection unit is configured to detect movement of a moving portion of the shift pedal.

15. The straddle-type vehicle as recited in claim 1, further comprising a link member arranged between the shift pedal and the detection unit.

16. The straddle-type vehicle as recited in claim 15, wherein the link member is adjustable in length so that a position of the shift pedal relative to the detection unit is adjustable.

* * * * *